United States Patent
Maguire

(10) Patent No.: US 11,602,883 B2
(45) Date of Patent: *Mar. 14, 2023

(54) COTTONSEED OIL LIQUID COLOR COMPOSITION AND METHOD

(71) Applicant: Stephen B. Maguire, West Chester, PA (US)

(72) Inventor: Stephen B. Maguire, West Chester, PA (US)

(73) Assignee: Riverdale Global, LLC, Aston, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/822,415

(22) Filed: Mar. 18, 2020

(65) Prior Publication Data
US 2020/0216637 A1    Jul. 9, 2020

Related U.S. Application Data

(63) Continuation of application No. 15/886,137, filed on Feb. 1, 2018, now Pat. No. 10,597,513, and a continuation of application No. 15/883,501, filed on Jan. 30, 2018, now Pat. No. 10,767,031, and a continuation of application No. 15/432,495, filed on Feb. 14, 2017, now Pat. No. 10,919,206, which is a continuation-in-part of application No. 14/333,579, filed on Jul. 17, 2014, now Pat. No. 9,708,462.

(60) Provisional application No. 61/847,119, filed on Jul. 17, 2013.

(51) Int. Cl.
| | |
|---|---|
| B29C 48/95 | (2019.01) |
| C08J 3/22 | (2006.01) |
| C08K 5/09 | (2006.01) |
| C08K 5/00 | (2006.01) |
| C08J 3/205 | (2006.01) |
| B29C 48/06 | (2019.01) |
| B29C 48/29 | (2019.01) |
| C08K 5/01 | (2006.01) |
| C08K 5/103 | (2006.01) |
| B29K 105/00 | (2006.01) |
| B29C 45/00 | (2006.01) |

(52) U.S. Cl.
CPC .............. *B29C 48/95* (2019.02); *B29C 48/06* (2019.02); *B29C 48/29* (2019.02); *C08J 3/2053* (2013.01); *C08J 3/226* (2013.01); *C08K 5/0041* (2013.01); *C08K 5/01* (2013.01); *C08K 5/09* (2013.01); *C08K 5/103* (2013.01); *B29C 45/0013* (2013.01); *B29C 2948/92704* (2019.02); *B29K 2105/0011* (2013.01); *B29K 2105/0032* (2013.01); *C08J 2300/00* (2013.01); *C08J 2300/22* (2013.01); *C08J 2491/00* (2013.01)

(58) Field of Classification Search
CPC ........ C08K 5/09; C08K 3/013; C08K 5/0041; C08K 5/01; B29C 48/022; B29C 48/94; B29C 48/06; B29C 48/29; B29C 45/0001; B29C 45/0013; B29C 45/47; C08J 3/203; C08J 3/2053; C08J 3/226
See application file for complete search history.

(56) References Cited

U.S. PATENT DOCUMENTS

| | | |
|---|---|---|
| 600,233 A | 3/1898 | Palm |
| 1,305,964 A | 6/1919 | Dickson |
| 1,451,759 A | 4/1923 | Bruhn |
| 1,482,376 A | 2/1924 | Anderson |
| 1,489,348 A | 4/1924 | Hampton |
| 1,707,977 A | 4/1929 | Davis |
| 2,188,646 A | 1/1940 | Bunch |
| 2,199,657 A | 5/1940 | Bunch |
| 2,387,233 A | 10/1945 | Clapp |
| 2,606,696 A | 8/1952 | Miner |
| 2,656,828 A | 10/1953 | Conover |
| 2,665,825 A | 1/1954 | Poitras et al. |
| 2,701,881 A | 2/1955 | McGee |
| 2,873,892 A | 2/1959 | Nelson et al. |
| 2,909,315 A | 10/1959 | Sampietro |
| 2,956,822 A | 10/1960 | Kates |
| 3,252,618 A | 5/1966 | Anderson |
| 3,297,049 A | 1/1967 | Moscovitz |
| 3,391,645 A | 7/1968 | Koza |
| 3,468,904 A | 9/1969 | Kritchevsky |
| 3,471,178 A | 10/1969 | Roe |
| 3,477,698 A | 11/1969 | Smith et al. |
| 3,481,509 A | 12/1969 | Marhauer |
| 3,488,204 A | 1/1970 | Hardy |
| 3,518,033 A | 6/1970 | Anderson |
| 3,785,412 A | 1/1974 | Stone |
| 3,814,388 A | 6/1974 | Jakob |
| 3,820,828 A | 6/1974 | Fiddler |

(Continued)

FOREIGN PATENT DOCUMENTS

| | | |
|---|---|---|
| CA | 2643213 A1 | 8/2007 |
| CN | 2809263 Y | 8/2006 |

(Continued)

OTHER PUBLICATIONS

Forty-four page two-sided brochure including cover and back pages entitled "Maguire: Auxiliary equipment for the plastics industry" of Maguire Products Inc. Oct. 2000.

Two-sided color brochure entitled Maguire: Model MPA Liquid Color Pump Maguire Products Inc. published Dec. 28, 1995.

International Search Report for PCT/US02/02934 dated Feb. 20, 2003.

(Continued)

*Primary Examiner* — Stella K Yi
(74) *Attorney, Agent, or Firm* — Fox Rothschild LLP

(57) ABSTRACT

A liquid colorant for use in molding or extruding plastic products comprises pigment dispersed in cottonseed oil.

7 Claims, No Drawings

(56) References Cited

U.S. PATENT DOCUMENTS

| | | | |
|---|---|---|---|
| 3,883,275 A | 5/1975 | Browne | |
| 3,953,218 A * | 4/1976 | Pollard | C09B 67/006 |
| | | | 106/504 |
| 3,957,399 A | 5/1976 | Siczek | |
| 3,960,393 A | 6/1976 | Hosokawa | |
| 3,988,088 A | 10/1976 | King et al. | |
| 3,998,103 A | 12/1976 | Bjorklund et al. | |
| 4,046,495 A | 9/1977 | Grimm, Jr. | |
| 4,124,042 A | 11/1978 | Foulkes | |
| 4,185,948 A | 1/1980 | Maguire | |
| 4,211,345 A | 7/1980 | Taubenmann | |
| 4,251,796 A | 2/1981 | Soeda | |
| 4,377,291 A | 3/1983 | Albertini | |
| 4,382,618 A | 5/1983 | Grisebach | |
| 4,469,127 A | 9/1984 | Kitamura | |
| 4,473,173 A | 9/1984 | DeGroff et al. | |
| 4,479,107 A | 10/1984 | Bleeke | |
| 4,501,405 A | 2/1985 | Usry | |
| 4,571,416 A | 1/1986 | Jarzombeck et al. | |
| 4,580,721 A | 4/1986 | Coffee | |
| 4,586,882 A | 5/1986 | Tseng | |
| 4,605,297 A | 8/1986 | Livingston et al. | |
| 4,606,710 A | 8/1986 | Maguire | |
| 4,621,990 A | 11/1986 | Forsythe et al. | |
| 4,657,490 A | 4/1987 | Abbott | |
| 4,759,189 A | 7/1988 | Stropkay | |
| 4,796,782 A | 1/1989 | Wales | |
| 4,815,042 A | 3/1989 | Pratt | |
| 4,834,071 A | 5/1989 | Hosoi et al. | |
| 4,921,132 A | 5/1990 | Wales | |
| 4,967,940 A | 11/1990 | Blette et al. | |
| 5,039,279 A | 8/1991 | Gangemi | |
| 5,116,547 A | 5/1992 | Tsukahara et al. | |
| 5,183,075 A | 2/1993 | Stein | |
| 5,187,993 A | 2/1993 | Nicholson et al. | |
| 5,199,852 A | 4/1993 | Danby | |
| 5,215,215 A | 6/1993 | Sauer | |
| 5,225,210 A | 7/1993 | Shimoda | |
| 5,257,914 A | 11/1993 | Reynolds | |
| 5,318,431 A | 6/1994 | Chang | |
| 5,344,232 A | 9/1994 | Nelson et al. | |
| 5,364,242 A | 11/1994 | Olsen | |
| 5,402,670 A | 4/1995 | Wicnienski | |
| 5,404,904 A | 4/1995 | Glaser | |
| 5,423,455 A | 6/1995 | Ricciardi | |
| 5,580,503 A | 12/1996 | Hall, III | |
| 5,609,191 A | 3/1997 | Topping | |
| 5,622,392 A | 4/1997 | Gochenouer | |
| 5,723,517 A | 3/1998 | Campo | |
| 5,853,244 A | 12/1998 | Hoff et al. | |
| 5,911,339 A | 6/1999 | Peterson | |
| 5,953,923 A | 9/1999 | Davies | |
| 5,980,490 A | 11/1999 | Tsoukalis | |
| 5,984,777 A | 11/1999 | Kuchar | |
| 5,988,983 A | 11/1999 | Furusawa | |
| 6,007,236 A | 12/1999 | Maguire | |
| 6,057,514 A | 5/2000 | Maguire | |
| 6,188,936 B1 | 2/2001 | Maguire et al. | |
| 6,213,739 B1 | 4/2001 | Phallen et al. | |
| 6,287,491 B1 | 9/2001 | Kilim et al. | |
| 6,386,841 B1 | 5/2002 | Probst | |
| 6,402,363 B1 | 6/2002 | Maguire | |
| 6,402,865 B1 | 6/2002 | Handa et al. | |
| 6,502,013 B1 | 12/2002 | Sosnik | |
| 6,523,451 B1 | 2/2003 | Liao | |
| 6,599,005 B2 | 7/2003 | van Der Wei | |
| 6,669,358 B2 | 12/2003 | Shimoda | |
| 6,719,453 B2 | 4/2004 | Cosman et al. | |
| 6,732,629 B1 | 5/2004 | Miller et al. | |
| 6,840,744 B2 | 1/2005 | Watling | |
| 6,853,100 B2 | 2/2005 | Yumita | |
| 6,879,876 B2 | 4/2005 | O'Dougherty et al. | |
| 6,880,965 B1 | 4/2005 | Sheffield, Jr. | |
| 6,991,004 B2 | 1/2006 | Kaufhold et al. | |
| 7,118,349 B2 | 10/2006 | Oglesby | |
| 7,154,069 B1 | 12/2006 | Gordon | |
| 7,201,290 B2 | 4/2007 | Mehus | |
| 7,264,161 B2 | 9/2007 | Polarine | |
| 7,311,882 B1 | 12/2007 | Renzi | |
| 7,390,119 B2 | 6/2008 | Maguire | |
| 7,416,096 B2 | 8/2008 | Maguire | |
| 7,526,911 B2 | 5/2009 | Pickard et al. | |
| 7,594,717 B2 | 9/2009 | Sheinman | |
| 7,958,915 B2 | 6/2011 | Maguire | |
| 7,980,834 B2 | 7/2011 | Maguire | |
| 8,042,578 B2 | 10/2011 | Post | |
| 8,230,877 B2 | 7/2012 | Roberge et al. | |
| 8,627,852 B2 | 1/2014 | Hatton | |
| 8,757,217 B2 | 6/2014 | Maguire | |
| 8,800,821 B2 | 8/2014 | Maguire et al. | |
| 8,844,584 B1 | 9/2014 | Haley | |
| 9,188,118 B2 | 11/2015 | Maguire | |
| 9,599,265 B2 | 3/2017 | Maguire | |
| 9,637,283 B2 | 5/2017 | Maguire | |
| 2002/0023449 A1 | 2/2002 | Park et al. | |
| 2002/0031822 A1 | 3/2002 | Van Der Wei et al. | |
| 2002/0122103 A1 | 9/2002 | Yamamoto et al. | |
| 2002/0189667 A1 | 12/2002 | O'Dougherty et al. | |
| 2003/0051767 A1 | 3/2003 | Coccaro | |
| 2003/0071868 A1 | 4/2003 | Koshikawa et al. | |
| 2003/0095468 A1 | 5/2003 | Shimoda | |
| 2003/0142580 A1 | 7/2003 | Maguire | |
| 2003/0218014 A1 | 11/2003 | Gregory et al. | |
| 2004/0020723 A1 | 2/2004 | Schuman | |
| 2005/0052945 A1 | 3/2005 | Maguire | |
| 2005/0126638 A1 | 6/2005 | Gilbert | |
| 2006/0067844 A1 | 3/2006 | Iversen | |
| 2006/0151051 A1 | 7/2006 | Py | |
| 2006/0169718 A1 | 8/2006 | Buining | |
| 2007/0071624 A1 | 3/2007 | Brewer | |
| 2007/0292288 A1 | 12/2007 | Maguire | |
| 2008/0267002 A1 | 10/2008 | Rannasmaa | |
| 2010/0276033 A1 | 11/2010 | Asp et al. | |
| 2010/0322644 A1 | 12/2010 | Ajima | |
| 2011/0200464 A1 | 8/2011 | Maguire et al. | |
| 2012/0189762 A1 | 7/2012 | Reineccius | |
| 2012/0195771 A1 | 8/2012 | Brender a Brandis | |
| 2012/0260992 A1 | 10/2012 | Maguire | |
| 2012/0328804 A1 * | 12/2012 | Allen | C08L 67/02 |
| | | | 428/34.1 |
| 2013/0334258 A1 | 12/2013 | Maguire | |
| 2014/0087035 A1 | 3/2014 | Cummings | |
| 2014/0147288 A1 | 5/2014 | Maguire | |
| 2014/0224830 A1 | 8/2014 | Maguire | |
| 2014/0348667 A1 | 11/2014 | McCourt et al. | |
| 2015/0020713 A1 | 1/2015 | Maguire | |
| 2015/0066794 A1 | 3/2015 | Maguire et al. | |
| 2015/0108748 A1 | 4/2015 | Maguire | |
| 2015/0165662 A1 | 6/2015 | Maguire | |
| 2016/0040661 A1 | 2/2016 | Maguire | |
| 2017/0001354 A1 | 1/2017 | Nobuta et al. | |

FOREIGN PATENT DOCUMENTS

| | | |
|---|---|---|
| DE | 3433693 A1 | 3/1986 |
| DE | 40 23 933 A1 | 1/1991 |
| EP | 1400332 A1 | 3/2004 |
| FR | 1 477 595 A | 4/1967 |
| FR | 2 273 648 A1 | 1/1976 |
| GB | 1145752 | 3/1969 |
| JP | 3550699 B2 | 8/2004 |
| JP | 2013-018283 A | 1/2013 |
| KR | 10-2011-0100596 A | 9/2011 |
| WO | WO 01/49374 A1 | 7/2001 |
| WO | WO 2015/089499 | 6/2015 |

OTHER PUBLICATIONS

Written Opinion for PCT/US02/02934 dated Mar. 24, 2003.
International Search Report for PCT/US11/021994 dated May 24, 2011.
Written Opinion for PCT/US11/021994 dated May 24, 2011.

(56) References Cited

OTHER PUBLICATIONS

Thirty-two page catalog entitled "Maguire Color Blending Equipment" published by Maguire Products Inc. 1993 United States.
International Search Report for PCT/US2014/070284 dated Apr. 15, 2015.
Written Opinion for PCT/US2014/070284 dated Apr. 15, 2015.
International Search Report for PCT/US2014/053391 dated Jan. 29, 2015.
Written Opinion for PCT/US2014/053391 dated Jan. 29, 2015.
Wayback Machine of SMC Linear Actuators Sep. 11, 2011 SMC Accessed on Apr. 6, 2016.
Wayback Machine of SMC Linear Actuator C02 Series Catalog Sep. 11, 2011 SMC Accessed on Apr. 6, 2016.
Extended European Search Report and Written Opinion for European Patent Application No. 14870414.1, dated Sep. 12, 2017.
European Search Report and Written Opinion for European Patent Application No. 14840183.9, dated Apr. 24, 2017.
Extended European Search Report and Written Opinion for European Patent Application No. 14840183.9, dated Aug. 7, 2017.
International Search Report and Written Opinion for PCT/US2018/025069; dated Jul. 17, 2018.
Dec. 31, 2018 Non-Final Office Action against Applicant's co-pending U.S. Appl. No. 15/420,762.
Mar. 6, 2019 Final Office Action against Applicant's co-pending U.S. Appl. No. 15/298,802.
Mar. 8, 2019 Final Office Action against Applicant's co-pending U.S. Appl. No. 14/700,911.
Jan. 25, 2019 Final Office Action against Applicant's co-pending U.S. Appl. No. 15/581,960.

\* cited by examiner

COTTONSEED OIL LIQUID COLOR COMPOSITION AND METHOD

CROSS-REFERENCE TO RELATED PATENT PROPERTIES

This patent application is a 35 USC 120 continuation of U.S. Ser. No. 15/886,137, entitled "Cottonseed Oil Based Additive Compositions for Plastic Molding and Extrusion," filed 2 Feb. 2018 in the name of Stephen B. Maguire, published as U.S. 2018-0155523 A1 on 7 Jun. 2018. This application claims the priority of the '137 application under 35 USC 120.

This patent application is also a 35 USC 120 continuation of U.S. Ser. No. 15/432,495, entitled "Liquid Color Composition With Cottonseed Oil Base," filed 14 Feb. 2017 in the name of Stephen B. Maguire, and published as U.S. 20174-0152366 A1, on 1 Jun. 2017. This application claims the priority of the '495 application under 35 USC 120.

This patent application is also a 35 USC 120 continuation of U.S. Ser. No. 15/883,501, entitled "Cottonseed Oil Based Liquid Color Composition And Plastics Coloring Method Using The Same," filed 30 Jan. 2018 in the name of Stephen B. Maguire, published as U.S. 2018-0155522 A1 on 7 Jun. 2018. This application claims the priority of the '501 application under 35 USC 120.

This patent application further claims the benefit of the priority of U.S. Pat. No. 9,708,462, entitled "Liquid Color Composition With Cottonseed Oil Base," issued 18 Jul. 2017 in the name of Stephen B. Maguire. The priority of the '462 patent is claimed through the '495 application. The '462 patent issued from U.S. patent application Ser. No. 14/333,579, filed 17 Jul. 2014.

This patent application also claims the benefit of the priority of U.S. provisional patent application 61/847,119, entitled "Liquid Color Composition with Cottonseed Oil Base," filed 17 Jul. 2013 in the name of Stephen B. Maguire. The priority of the '119 application is claimed through the '462 patent under 35 USC 120.

BACKGROUND OF THE INVENTION

Field of the Invention

This invention involves the use of cottonseed oil as the primary ingredient or a secondary ingredient for the liquid carrier when manufacturing liquid color for the plastics industry.

Description of the Prior Art

Plastic products are most often colored.

Color pigments begin in powder form. Because powder is messy and difficult to handle, it is almost always pre-dispersed into some "carrier" that is easier to handle.

Typically color pigment is pre-dispersed into pellets of plastic resin, with the pellets containing typically 50% pigment, by weight. In the United States, these pellets are referred to as "concentrate" and in Europe as "masterbatch".

DESCRIPTION OF THE INVENTION

The following description is merely exemplary in nature and is not intended to limit the described embodiments of the invention or uses of the described embodiments. As used herein, the words "exemplary" and "illustrative" mean "serving as an example, instance, or for illustration." Implementations or embodiments or abstracts disclosed herein as being "exemplary" or "illustrative" are not necessarily to be construed as preferred or advantageous over other implementations, aspects, or embodiments. All of the implementations or embodiments described in this description are exemplary implementations and embodiments provided to enable persons of skill in the art to make and to use the implementations and embodiments as disclosed below, to otherwise practice the invention, and are not intended to limit the scope of the invention, which is defined by the claims.

Furthermore, by this disclosure, there is no intention on the part of the Applicant to be bound by any express or implied theory presented in the description of the invention. It is to be understood that the specific implementations, devices, processes, aspects, and the like described in the following portion of the application, usually referred to as the "specification," are simply exemplary embodiments of the inventive concepts defined in the claims. Accordingly, specific physical characteristics relating to the embodiments disclosed herein are not to be considered as limiting as respecting the invention unless the claims expressly state otherwise.

A better method to make the pigment easier to handle is to pre-disperse the pigment into a liquid carrier. This is the method to which this invention is directed.

The liquid carrier for the pigment must be compatible with the plastic resin to which it is to be added. Different resins may require different carriers. When selecting a liquid carrier, certain characteristics are desirable while other characteristics must be avoided.

Surfactants, or "soap-like" carriers can cause "slip" in the molding or extrusion process, which must be avoided.

The liquid carrier must not break down at the high temperatures required in the molding or extrusion process that melts the plastic resin.

Carrier liquids that impart an odor to the final part cannot be used when molding or extruding products to be used to contain food, such as plastic water bottles.

Cost and availability of the carrier liquid are always factors.

Heretofore, no single liquid carrier solves all these problems. However this invention is based on the discovery that cottonseed oil is superior to many other carriers in meeting a number of these requirements and solving many or the problems. Cottonseed oil has not previously been used as a carrier for pigment in making liquid color to be used in plastics molding or extrusion.

Cottonseed oil has a relatively high flash point, and a high smoke point, well above 400° F. Most other liquids that could be used as carriers smoke below 400° F.

Cottonseed oil has very little odor. Cottonseed oil is known to be used as a cooking oil that does not impart any flavor to the food being cooked. This is a benefit when molding or extruding plastic products used for food packaging.

Cottonseed oil is high in antioxidants, providing an advantage in preserving products packaged in plastic that has been molded or extruded using a cottonseed oil carrier for the liquid color that provides color for the product packaging.

Cottonseed oil is high in vitamin "E", an antioxidant, which is often required as an additive when using other carriers.

Cottonseed oil is commercially available in bulk qualities, and is competitively priced. As used herein and as used in the practice of the invention "cottonseed oil" means oil that has been obtained from seeds of cotton plants, typically by mechanically pressing the seeds to remove the oil from the seeds; as used herein and as used in the practice of the invention the cottonseed oil is "pure", meaning that it has not been amidized or partially amidized or otherwise processed after being extracted from the seeds of cotton plants.

In one of its aspects, this invention provides a method of fabricating a plastic article of pre-selected color where the method includes preparing a blend, where the blend comprises solid plastic resin pellets and liquid color of a hue and in an amount to impart the pre-selected color to the article to be fabricated, where the liquid color includes cottonseed oil, and thereafter forming the blend under pressure and heat into the plastic article. The method may be accomplished either by injection molding or by extrusion. In practice of this aspect of the invention, the liquid color preferably comprises at least one dispersion of a single color pigment in cottonseed oil. Even more preferably, the liquid color may comprise a plurality of such dispersions, each of a single pigment, in cottonseed oil.

The method may further include the liquid color comprising at least one additive to facilitate fabrication of the plastic article, where the additive may be selected from the group comprising lubricants, blowing agents, light stabilizers, nucleating agents, antistatic agents and antioxidants.

In another aspect of this invention, the invention provides a liquid colorant for use in molding or extruding plastic products where the colorant comprises pigment dispersed in cottonseed oil. In a more limited aspect of the invention, the invention provides a liquid colorant for use in molding or extruding plastic products consisting of only pigment and cottonseed oil.

In still another aspect, this invention provides a liquid colorant for use in molding or extruding plastic products where the colorant includes pigment, cottonseed oil, and at least one additive, with the additive desirably being dispersed together with the pigment in the cottonseed oil. In this aspect of the invention, the additive may be one or more lubricants, blowing agents, light stabilizers, nucleating agents, antistatic agents, and antioxidants.

In the preferred practice of this invention, a single pigment dispersion is prepared initially by dispersing pigment of a desired color in cottonseed oil to create a liquid blend. The pigment is initially introduced into a vat of cottonseed oil which acts as a liquid carrier. The pigment is stirred into the cottonseed oil. The pigment is added to the cottonseed oil in the known correct proportion. Typically the batch of pigment added to the cottonseed oil is from 50% to 70% by weight of the resulting pigment-cottonseed oil blend. That is the preferred range; the range can be as low as 25% by weight of pigment relative to the weight of the resulting pigment-cottonseed oil blend up to 80% by weight of pigment to the weight of the resulting pigment-cottonseed oil blend.

In general, it is desirable to put as much pigment into the cottonseed oil as is possible.

Next the dispersion of the pigment in the cottonseed oil is milled by passing the liquid through a mill that serves to break down any agglomerates of pigment that may remain in the single pigment dispersion, thereby reducing the particle size of the pigment to as small a size as possible. The resulting particles of pigment powder are very, very small, which produces the fullest, richest color. Milling the single pigment dispersion allows the use of less pigment to perform the particular coloring function thereby reducing costs. The milling may be done using a roller mill or a sand mill. Both roller mills and sand mills are common industrial mills.

In the practice of the invention, it is desirable at times to produce a color that is not one of the colors of the basic pigment. In such case, two or more single pigment dispersions, each dispersion being of a single pigment in cottonseed oil, are prepared. The two or more single pigment dispersions are then blended together to produce a resulting dispersion exhibiting the correct hue or shade of color as desired. The resulting dispersion is then milled. This two-step process allows milling of a larger quantity of pigment in the resulting dispersion at one time so that clean up between milling different colors is less frequent and avoids the expense of milling of each of the single pigment dispersions separately.

Use of cottonseed oil as the carrier for the single pigment dispersion or the blend of single pigment dispersion results in liquid color that is compatible with nearly all resins that are currently used in plastic molding and extrusion. The cottonseed oil-based pigment dispersion does not leach out of any finished product, nor does the cottonseed oil by itself leach out of any finished product. The cottonseed oil has been found to hold the pigment powder particles in suspension very well and accepts a high loading of pigment.

The pigment-cottonseed oil liquid colorant in accordance with the invention may be used to color most commercially used thermoplastics, whether processed by means of extrusion, injection molding or blow molding, as well as thermoplastics that are processed using less conventional processes. When properly formulated, the pigment-cottonseed oil liquid color according to the invention is not just compatible with a base resin, but frequently improves the fabricating process and/or the performance properties of the fabricated plastic parts.

Liquid color according to this invention may be formulated in various ways to provide various advantageous product characteristics. For example, commodity colorants may be formulated in accordance with the invention to maximize savings without sacrificing processability and cosmetic appearance of the final plastic parts. Such commodity colorants offer the processor economics of color and are suitable for mass manufacture of volume parts such as housewares, disposable goods, toys and the like.

The invention also has applicability to providing liquid color for use in fabricating articles designed for outdoor use, specifically for lawn and garden applications, for the toy and recreation industries. The liquid color in accordance with the invention may be formulated to meet very stringent requirements of heat stability and light fastness of the resulting fabricated color parts. Such parts may be used in applications requiring extended exposure to sunlight and/or unusually high temperatures during the fabrication process.

The liquid color according to the invention may be produced to provide special effects such as fluorescent, phosphorescent, pearlescent, and non-dispersing finishes, where such unconventional appearances dictated by the design of the parts.

Liquid color in accordance with the invention is typically from 20% to 40% cheaper than use of pelletized color concentrate.

In another method for practicing the invention, one may make liquid color for use in the course of molding or extruding plastic parts by initially providing a collection of pigments. Next, one selects a formula for the pigment(s) and liquid carrier that will provide liquid color in a desired hue for coloring plastic parts being molded or extruded. Selecting the formula may be a "trial and error" process, in that slight changes in hue as required by a customer require changes in the pigment constituency, thereby requiring experimentation as to the exact formula of pigments required to produce the required hue. Once the formula has been established for the amount of pigment(s) and the amount of liquid carrier, the pigments are selected in amounts required by the formula by the collection of pigments. A liquid carrier of cottonseed oil is provided in an amount according to the formula and the selected pigments are then blended, preferably but not necessarily all at once, into the cottonseed oil to produce a required liquid color. When this approach is used, the finished liquid color is generally not milled, as the mill would have to be cleaned after every color blend. However, such liquid color can be milled if necessary. This method of the invention avoids the two-step process of making the single pigment dispersions, milling single pigment dispersions individually, and then combining the single pigment dispersions to produce the required liquid color.

The processing of thermoplastic resin and/or the performance of the fabricated plastic parts can often be greatly enhanced through use of additives. Many commercial resins already include additives. However, significant benefits can be derived from further modification of such compounds in many cases. Moreover, use of additives affords a plastics processor the opportunity to tailor the plastic resin material to a specific application.

Processing aid-type additives improve productivity of the molding or extrusion machinery through reduction of internal friction; these additives are referred to as "lubricants." Other processing aid-type additives change polymer morphology and are referred to as "nucleating agents." Still other processing aid-type additives remove excessive heat and are in the form of endothermic blowing agents. Yet additional processing aid-type additives suppress thermal decomposition during processing and are generally referred to as "antioxidants."

Other additives, such as blowing agents and optical brighteners, enhance aesthetics and/or performance properties of the final parts by, for example, providing antistatic properties or ultraviolet light stabilization characteristics to the product. Modification of properties of thermopolymers through the addition of various chemical additives is economically preferable to the introduction of an entirely new resin. The most economical way to add these additives to the molding or extrusion process is through the use of liquid color in accordance with this invention.

Although schematic implementations of present invention and at least some of its advantages are described in detail hereinabove, it should be understood that various changes, substitutions and alterations may be made to the apparatus and methods disclosed herein without departing from the spirit and scope of the invention as defined by the appended claims. The disclosed embodiments are therefore to be considered in all respects as being illustrative and not restrictive with the scope of the invention being indicated by the appended claims rather than by the foregoing description. All changes which come within the meaning and range of equivalency of the claims are therefore intended to be embraced therein. Moreover, the scope of this patent application is not intended to be limited to the particular implementations of apparatus and methods described in the specification, nor to any methods that may be described or inferentially understood by those skilled in the art to be present as described in this specification.

As disclosed above and from the foregoing description of exemplary embodiments of the invention, it will be readily apparent to those skilled in the art to which the invention pertains that the principles and particularly the compositions and methods disclosed herein can be used for applications other than those specifically mentioned. Further, as one of skill in the art will readily appreciate from the disclosure of the invention as set forth hereinabove, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

As used in the claims below, "comprising" means "including" while "consisting of" means "having only", and "consisting essentially of" means having the stated constituents plus trivial amounts of other reagents which do not materially affect the properties of the claimed product.

I claim the following:

1. A method of molding or extruding plastic parts comprising the steps of:
    a) providing a collection of pigments in powder form;
    b) providing a quantity of cottonseed oil in non-amidized and non-partially-amidized form for use as a cottonseed oil carrier;
    c) creating a plurality of single pigment dispersions each in the cottonseed oil carrier, each of the plurality of single pigment dispersions consisting of the single pigment and the cottonseed oil carrier;
    d) blending selected ones of the plurality of single pigment dispersions to create a blend of a desired color shade;
    e) milling the blend; and
    f) adding the blend to form thermoplastic resin in the course of molding or extrusion.

2. The method of claim 1 wherein the pigment in each of the plurality of single pigment dispersions comprises from about 50% to about 70% by weight of the dispersion.

3. The method of claim 1 wherein the pigment in each of the plurality of single pigment dispersions comprises from about 25% to about 80% by weight of the dispersion.

4. The method of claim 1 wherein the pigment in the blend of the plurality of single pigment dispersions comprises from about 25% to about 80% by weight of the blend.

5. A method of making liquid color for use in molding or extruding plastic parts comprising the steps of:
    a) providing a collection of pigments in powder form;
    b) providing a quantity of cottonseed oil in non-amidized and non-partially-amidized form for use as a cottonseed oil carrier;
    c) creating a plurality of single pigment dispersions each in the cottonseed oil carrier, each of the plurality of single pigment dispersions consisting of a single one of the pigments and the cottonseed oil carrier;
    d) blending selected ones of the plurality of single pigment dispersions to create a blend of a desired color shade; and
    e) milling the blend.

6. The method of claim 1 wherein the pigment in the blend of the plurality of single pigment dispersions comprises from about 25% to about 80% by weight of the blend.

7. The method of claim 5 further comprising adding at least one additive selected from the group comprising lubricants, blowing agents, light stabilizers, nucleating agents, antistatic agents and antioxidants, to the blend.

\* \* \* \* \*